M. C. DAVIS.
Sheep-Shearing Machines.
No. 6,023. Reissued Aug. 25, 1874.
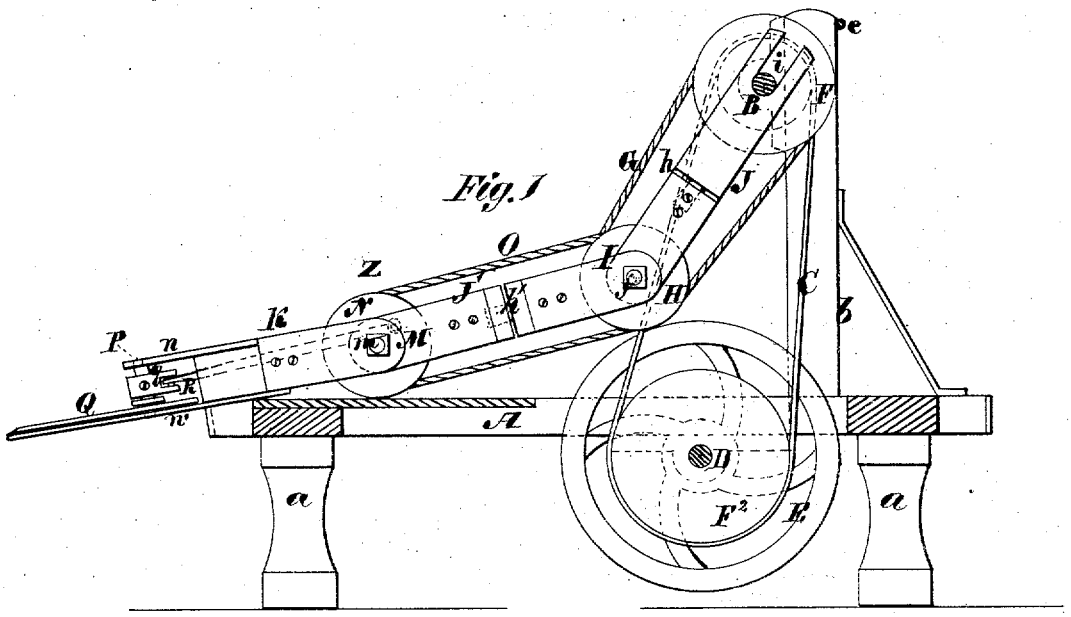
Fig. 3
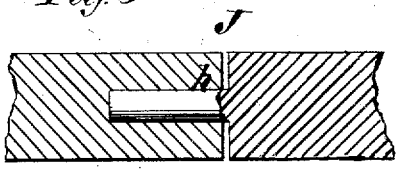
Fig. 2
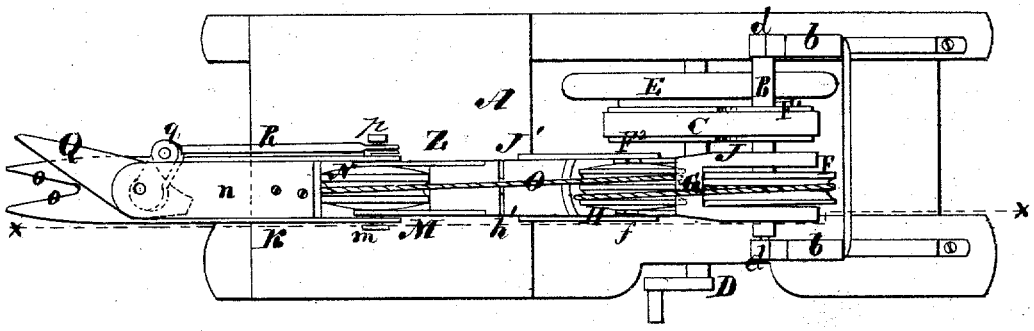
Witnesses.
R. T. Campbell
J. N. Campbell
Inventor
M. C. Davis
by
Mason, Fenwick & Lawrence
THE GRAPHIC CO. PHOTO-LITH. 39 & 41 PARK PLACE, N.Y.

UNITED STATES PATENT OFFICE.

MARVEL C. DAVIS, OF GUILFORD, OHIO, ASSIGNOR TO ROSWELL T. SMITH JOSEPH K. PRIEST, JOHN G. BLUNT, AND WM. EARL, JR.

IMPROVEMENT IN SHEEP-SHEARING MACHINES.

Specification forming part of Letters Patent No. 45,703, dated January 3, 1865; reissue No. 6,023, dated August 25, 1874; application filed July 3, 1873.

CASE A.

*To all whom it may concern:*

Be it known that I, MARVEL C. DAVIS, of Guilford, in the county of Medina and the State of Ohio, have invented a new and useful Improvement in Machines for Shearing; and I do hereby declare that the following is a full, clear, and exact description of the same, reference being had to the accompanying drawings forming a part of this specification, in which—

Figure 1 is a longitudinal section, on the line *x x* of Fig. 2, of the improved machine. Fig. 2 is a top view of the same, and Fig. 3 a section in detail of one of the swivel-joints of the jointed bar or arm of the machine.

The objects of my improvement are to increase the extent of the independent and united movability of the different parts of the jointed arm, which has the shearing-cutters attached to it, and at the same time to operate the cutters by gearing which acts with a positive power.

The nature of my invention consists in certain different combinations of parts, as hereinafter described, and as claimed specifically, whereby the above-mentioned objects are secured, and the operation of shearing hair or wool from the different parts of an animal's body is greatly facilitated, and the necessity of swinging around the standard or frame of the machine is avoided.

The construction is as follows: A suitable frame or support, consisting of a table A, with legs *a a* and standards *b b*, is first provided. This may be of any suitable construction, as its only office is to support the gearing and the jointed arm to which the shearing-cutters are attached. At or near the upper ends of the standards *b b* a horizontal shaft, B, is arranged in bearings *d d*, and on this shaft two pulleys, F and $F^1$, are applied, being keyed thereon. Below the table or platform A another horizontal shaft, D, is arranged, on which is keyed a "fly" or balance wheel, E, and a pulley, $F^2$. This latter shaft is the driving-shaft, and rotary motion may be communicated to it from any convenient prime mover, and said motion be transmitted to the shaft B by means of the belt C, which passes around pulleys $F^1$ $F^2$. The first rod or link, J, of the jointed arm, to which the shearing-cutters are attached, is applied to the shaft B, so as to swing back and forth about said shaft and to hang pendent therefrom. Its upper end is slotted and bifurcated so as to receive the pulley F and the shaft B, in the manner represented. The straps on the lower end of this link have pivoted to them another rod or link, J′, similar to that of J. Both of the links (J and J′) are constructed with a joint between their respective ends. The joint of link J is lettered *h*, and that of link J′ is lettered *h′*. The joints *h* and *h′* are swivel-joints, and are formed, as shown, by a pin or tenon on one section of a link and a socket on the other section. The joint *h* allows the lower section of the link to receive lateral oscillations, while by the means of the joint at B the whole link is allowed free vibrations in a longitudinal direction about the shaft B. H is a pulley between the jointed ends of the links J and J′, it being placed on the axial pin *f* of the joint I, and G is a belt passed around the pulleys F and H, for transmitting the power of shaft D. K is the cutter carrying link of the jointed arm. This link is jointed to the front end of the link J′ by means of straps on the respective links, and an axial pin, *m*, on which latter is a pulley, N, said pulley being between the two links. This way of connecting the links J′ and K forms a joint, M, which allows a free articulation up and down of the link K on the pin *m*, without any interference with the rotary motion imparted to the pulley N from the pulley H by means of the belt O, and at the same time the joint *h′* permits the link K to rotate or oscillate freely. The joint I, between the links J′ and J, permits the link J′ to vibrate up and down by means of its pin *f*, and the joint *h* allows the link J′ to vibrate in a horizontal plane or around said joint *h*, and the shaft B allows it to be vibrated back and forth longitudinally. To the front free end of the link K are secured two metal plates, *n n′*, one being on top and the other on the bottom thereof. The bottom plate, *n′*, extends a considerable distance farther out than the upper plate, *n*, and has a Λ-shaped notch made into its front end to form cutting-edges *o o*, shown clearly in Fig. 2. P is an arbor applied between the plates *n n'*, and having its end bearings therein, and on the lower part of this arbor a V-shaped knife, Q, is secured, which vibrates over the cutters *o o* of the plate *n'*. This arbor has an arm, *q*, keyed on it, which is connected to a crank, *p*, on the pivot *m* of the joint M, by means of a rod, R. The knife Q in this manner receives vibrations from the pivot *m*, on which the pulley N is keyed.

It will be seen from the above description that in the construction of my jointed arm to which the shearing-cutters are attached I have imitated the articulations of the human arm and hand, the joint M answering to the wrist-joint, the joint I corresponding to the elbow-joint, and the joint at B, of the link J, corresponding to the shoulder articulation, while the swivel-joints *h* and *h'* allow oscillating movements to be imparted to the hand portion or link K, corresponding to the rotary movements of the human hand. Or, in a few words, the jointed links of the arm can be moved forward and backward over the body and limbs of an animal in an almost universal manner, without restraint, and, at the same time, the cutter operated freely.

The normal position of the link J is vertical, but in the operation of shearing its lower end swings in the arc of a circle. This link, suspended as described, supports the intermediate link J' at its jointed end I, and thus relieves the operator from a great portion of the weight of the links J' and K.

What I claim as new is—

1. The link or rod J of a shearing implement, constructed with a joint, *h*, or its equivalent between its ends, in combination with the shaft B and the gearing F, H, and G, substantially as and for the purpose described.

2. In a shearing implement, the combination of the rod or link J, having a joint, *h*, the link J', having a joint, *h'*, elbow-joint I, and gearing F, H, N, G, and O, substantially as and for the purposes described.

3. In a shearing implement, the combination of the link J, having a joint, *h*, the rod or link J', having a joint, *h'*, link K, joints I and M, and the gearing F H N G O, substantially as and for the purpose described.

Witness my hand and seal in the matter of my application for reissue of my Letters Patent for a sheep-shearing machine.

MARVEL C. DAVIS. [L. S.]

Witnesses:

JENNIE E. DAVIS,
JOSEPH ROSS.